United States Patent [19]

Chiba et al.

[11] 4,422,669
[45] Dec. 27, 1983

[54] SEAT BELT TENSIONING DEVICE

[75] Inventors: Masakazu Chiba, Susono; Satosi Kuwakado, Aichi; Toshihiro Takei, Kariya; Noboru Tsuge, Kariya; Toshiaki Shimogawa, Aichi, all of Japan

[73] Assignees: Nippon Soken, Inc.; Toyota Jidosha Kogyo Kabushiki Kaisha, both of Aichi, Japan

[21] Appl. No.: 230,711

[22] Filed: Feb. 2, 1981

[30] Foreign Application Priority Data

Feb. 4, 1980 [JP] Japan .............................. 55-13302[U]

[51] Int. Cl.³ .............................................. B60R 21/10
[52] U.S. Cl. ...................................... 280/806; 60/636; 297/480
[58] Field of Search ...................... 280/805, 806, 807; 60/632–638; 297/471, 472, 480; 92/34, 35

[56] References Cited

U.S. PATENT DOCUMENTS

| 3,528,344 | 9/1970 | Rabenhorst | 92/35 |
| 4,008,780 | 2/1977 | Benjler | 180/820 |
| 4,258,934 | 3/1981 | Tsuge et al. | 280/806 |
| 4,262,932 | 4/1981 | Motonami et al. | 280/806 |
| 4,291,899 | 9/1981 | Muramoto | 280/806 |

Primary Examiner—Richard A. Bertsch
Attorney, Agent, or Firm—Parkhurst & Oliff

[57] ABSTRACT

A cylinder-piston type seat belt tensioning device comprises a broach pipe wherein a broach rod which is connected to a seat belt is disposed, a load limiting member connecting the broach rod to the piston, which is broken at a predetermined load, and locking means for locking the broach pipe in the cylinder when the load limiting member is broken. After the load limiting member is broken at a predetermined load, the broach rod returns while plastically deforming the broach pipe to absorb the kinetic energy of the occupant.

7 Claims, 3 Drawing Figures

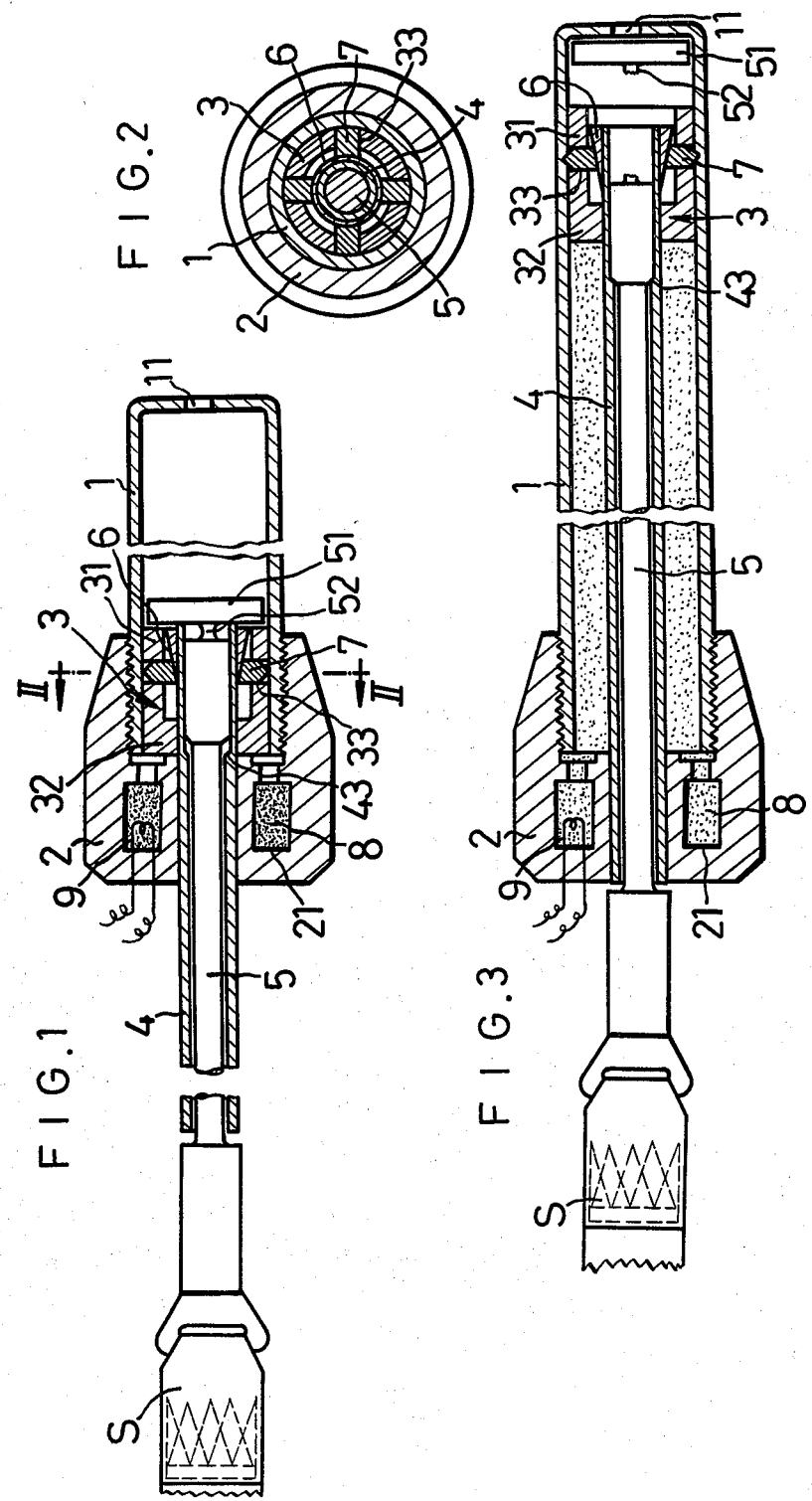

SEAT BELT TENSIONING DEVICE

BACKGROUND OF THE INVENTION

The present invention relates to a seat belt tensioning device for use in vehicles such as automobiles, more specifically to a seat belt tensioning device of the type that a piston which is connected to a seat belt is inserted within a cylinder.

The seat belt tensioning device of this type is provided with a piston operating means which moves the piston at an urgent time such as upon a vehicle impact.

According to this seat belt tensioning device, the seat belt is tensioned due to the movement of the piston. And as the piston operating means, gas pressure or the like is used.

However, it is very difficult to correctly adjust the seat belt tension force into a desired value by means of the piston operating means such as gas pressure.

Furthermore, in one example of the seat belt tensioning device of this type, the seat belt is connected to the piston through a deformable member which is plastically deformed and elongated due to a predetermined load and is drawn out of the cylinder.

However, according to such an energy absorbing means as described above, the deformable member is apt to be plastically elongated during the seat belt tensioning process.
And there is a problem that the drawn stroke is not sufficiently obtained after the piston is stopped.

Accordingly, one object of the present invention is to provide a seat belt tensioning device by which the tensioning force can be correctly adjusted to a desired value.

Still another object of the present invention is to provide a seat belt tensioning device which absorbs the kinetic energy of the occupants with certainty during a vehicle emergency.

Further object of the present invention is to provide a seat belt tensioning device having a simple construction.

DESCRIPTION OF THE DRAWINGS

Other objects and advantages of the invention will become apparent from the following description of embodiments with reference to the accompanying drawings wherein:

FIG. 1 is a longitudinally sectioned view of one embodiment of the present invention;

FIG. 2 is a transversely sectioned view taken along the line II—II of FIG. 1; and FIG. 3 is a longitudinally sectioned view of one embodiment of the present invention under operation.

SUMMARY OF THE INVENTION

A cylinder-piston type seat belt tensioning device comprises a broach pipe wherein a broach rod which is connected to a seat belt is disposed, a seat belt tensioning force limiting member connecting the broach rod to the piston, which is broken at a predetermined load, and a locking means for locking the broach pipe in the cylinder when the seat belt tensioning force limiting member is broken. After the seat belt tensioning force limiting member is broken at a predetermined load, the broach rod returns while plastically deforming the broach pipe to absorb the kinetic energy of the occupant.

DETAILED DESCRIPTION OF THE INVENTION

Hereinafter, the present invention will be explained in detail in accordance with the embodiment with reference to the drawings.

In FIG. 1 and FIG. 2, to one end of a cylinder 1, a thin walled cylinder head 2 is fixed, and an air vent 11 is provided in the other end of the cylinder 1.

A piston 3 is slidably disposed within a cylinder 1 on the side of the cylinder head 2. The piston 3 is composed of a cylindrical portion 31 and a bottom wall portion 32.

One end of a metallic pipe (hereinafter called a broach pipe) 4 slidably penetrates through each central portion of the cylinder head 2 and the bottom wall portion 32 of the piston 3.

Within the broach pipe 4, a metallic rod (hereinafter called broach rod) 5 is inserted. A plate portion 51, or bend portion, is formed in one intermediate portion of the broach rod 5 within the cylinder 1 and is engaged wth each end surface of the piston 3 and the broach pipe 4.

The plate portion 51 and the intermediate portion of the broach rod 5 is connected by a thin walled portion 52, or neck portion which is capable of being broken due to a predetermined seat belt tensioning force, to thereby function as a load limiting member.

The other end of the broach rod 5 is connected to a seat belt S in the outside of the cylinder 1.

The thin walled portion 52 moves together with the broach rod 5 according as the movement of the piston 3 and is broken when the load of the seat belt S applied to the broach rod 5 reaches a predetermined value.

The broach pipe 4 is formed so as to have a thinner wall in the portion within the piston 3 and have a thicker wall in the portion outside the piston 3. Between the thinner walled portion and the thicker walled portion, a stepped portion 43 is formed. The intermediate portions of the broach rod 5 is formed so as to have a large diameter in the portion accomodated within the thinner walled portion of the broach pipe 4 and have a small diameter in the portion accomodated within the thicker walled portion of the broach pipe 4.

Between the end of the portion having a large diameter of the broach rod 5 and the stepped portion 43 of the broach pipe 4, a small clearance is formed.

In the end of the broach pipe 4 which is inserted within the piston 3, a tapered member 6 having an inclined peripheral surface in its outer periphery is fixed. And four holes 33 are radially formed in the cylindrical portion 31 of the piston 3. Within each hole 33, a stopper piece 7 is radially inserted. Each stopper piece 7 is supported by the inclined peripheral surface of the tapered member 6 and each sharpened end thereof is opposed to the inner wall of the cylinder 1.

An annular powder chamber 21 is formed within the cylinder head 2 so as to be communicated with the inside of the cylinder 1 and the propellant 8 is charged within the powder chamber 21. An ignition filament 9 which is disposed within the powder chamber 21, is connected to an impact sensor (not shown) which detects a vehicle impact to generate an electrical signal.

Upon a vehicle impact, the ignition filament 9 produces heat upon receiving the electrical signal from the impact sensor. Then, the propellant 8 explodes to generate a large quantity of gas. This high gas pressure operates the piston 3 within the cylinder 1 to move rightwards in FIG. 1. The broach pipe 4 and the broach rod 5 move together with the piston 3. Consequently, the seat belt which is connected to the broach rod 5 is tensioned to restrain the occupant in his seat.

When the tensioning force of the seat belt S reaches the breaking load of the thin walled portion (the load limiting member) 52 due to the movement of the piston 3 as shown in FIG. 3, the thin walled portion 52 is broken. Then, the broach rod 5 starts to return leftwards in FIG. 3 and the end of the portion having a large diameter thereof is engaged with the stepped portion 43 of the broach pipe 4.

The piston 3 is about to move rightwards further due to high gas pressure. As a result, the stopper pieces 7 are lifted by the inclined peripheral surface of the tapered member 6 and the sharpened ends thereof cut into the inner wall of the cylinder 1. Consequently, the broach pipe 4 is locked in the cylinder 7 through the stopper pieces 7 and the tapered member 6.

Therefore, the occupant is kept restrained by the seat belt S which is connected to the broach rod 5 without being returned.

When the load applied to the seat belt S reaches the plastically deforming load of the broach pipe 4, which is made slightly larger than the breaking load of the thin walled portion 52, the broach rod 5 starts to move leftwards in FIG. 3, plastically deforming the stepped portion 43 of the broach pipe 4. Thus, the broach rod 5 is drawn out of the broach pipe 4 gradually. The kinetic energy of the occupant is absorbed during this process.

By the seat belt tensioning device of the present invention having the above described construction, the upper limit of the tensioning force of the seat belt can be correctly adjusted to a desired value.

Namely, by setting the operating force of the piston operating means into a value slightly larger than a predetermined value, a uniform seat belt tensioning force can be obtained even if the operating force is scattered.

And since the energy absorbing action by means of the broach pipe and the broach rod is performed after the seat belt tensioning action due to gas pressure is completed, the drawn stroke of the broach rod 5 can be effectively used only to absorb the kinetic energy of the occupant.

Furthermore, the energy absorbing action is performed only by the broach pipe and the broach rod, so that the construction of the energy absorbing member can be made simple. Further, since the load limiting member and the energy absorbing member operate separately, an adequate load can be set in each member separately.

Having now fully described the invention, it will be apparent to one of ordinary skill in the art that many changes and modifications can be made thereto without departing from the spirit or scope of the invention as set forth herein.

What is claimed is:

1. A seat belt tensioning device for a vehicle comprising:
    a cylinder having a piston slidably disposed within said cylinder so as to move in only one direction;
    piston operating means for moving said piston in said one direction during an emergency to apply a tensioning force to the seat belt;
    a plastically deformable metallic pipe, one end of which is disposed within said piston so as to move in said direction together with said piston;
    a metallic rod, one end of which is connected to a seat belt and the other end of which is disposed within said one end of said metallic pipe;
    a seat belt tensioning force limiting member secured to the said other end of said metallic rod to connect said rod to said piston; said tensioning force limiting member being broken when the seat belt tensioning force of said piston reaches a predetermined value;
    locking means for locking said pipe and said piston in said cylinder when said seat belt tensioning force limiting member is broken;
    said pipe being provided with an inner projecting portion which is engaged with said rod when tension load is applied to said seat belt so as to pull said metallic rod in the direction opposite to said one direction after said seat belt tensioning force limiting member is broken and said pipe is locked in said cylinder; and
    said projecting portion being plastically deformed by said rod when the tension load applied to said seat belt reaches the plastically deforming load of said pipe.

2. A seat belt tensioning device according to claim 1, wherein:
    said rod is comprised of an intermediate portion disposed within said metallic pipe, a plate shaped head portion disposed on said one end of said metallic pipe so as to be in contact with one end surface of said piston, and a thin walled neck portion formed between said head portion and said intermediate portion so as to connect said intermediate portion to said head portion;
    said neck portion is broken at the predetermined seat belt tensioning force; and
    said head portion and said neck portion comprise said seat belt tensioning force limiting member.

3. A seat belt tensioning device according to claim 2, wherein:
    said pipe comprises a portion having a large inner diameter, a portion having a small inner diameter and a stepped portion therebetween;
    said large inner diameter portion of said pipe is disposed within said piston;
    said intermediate portion of said rod comprises a portion having a large outer diameter, a portion having a small outer diameter and a stepped portion therebetween;
    said large outer diameter portion of said rod is disposed within said large inner diameter portion of said pipe and said small outer diameter portion of said rod is disposed within said small inner diameter portion of said pipe; and
    the diameter of said large outer diameter portion of said rod is larger than that of said small inner diameter portion of said pipe.

4. A seat belt tensioning device according to claim 1, wherein:
    the load at which said pipe is plastically deformed by said rod is set larger than that at which said seat belt tensioning force limiting member is broken.

5. A seat belt tensioning device according to claim 1, wherein:
    said locking means comprises a tapered member having an inclined peripheral surface, which is fixed to the outer periphery of said end of said pipe; and a plurality of stopper pieces which radially penetrate said piston and are supported by said tapered member;

said stopper pieces each having a sharpened end respectively which contacts with an inner wall of said cylinder.

6. A seat belt tensioning device according to claim 1, wherein:

said piston operating means is operated due to gas pressure.

7. A seat belt tensioning device according to claim 6, wherein:

said piston operating means comprises a powder chamber which is provided in said cylinder so as to be communicated with the inside of said cylinder and is charged with propellant and exploding means for exploding said propellant to generate gas.

* * * * *